(12) United States Patent
Zhang et al.

(10) Patent No.: US 10,549,745 B2
(45) Date of Patent: Feb. 4, 2020

(54) VEHICLE POWERTRAIN CONTROLLER AND METHOD

(71) Applicant: Ford Global Technologies, LLC, Dearborn, MI (US)

(72) Inventors: Chen Zhang, Canton, MI (US); Mark Steven Yamazaki, Canton, MI (US); Mark Davison, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 414 days.

(21) Appl. No.: 15/414,994

(22) Filed: Jan. 25, 2017

(65) Prior Publication Data

US 2018/0208175 A1  Jul. 26, 2018

(51) Int. Cl.
| | | |
|---|---|---|
| *B60W 20/12* | (2016.01) | |
| *B60W 10/06* | (2006.01) | |
| *B60W 10/08* | (2006.01) | |
| *B60W 10/11* | (2012.01) | |
| *B60W 10/26* | (2006.01) | |
| *B60W 20/50* | (2016.01) | |

(52) U.S. Cl.
CPC ............ *B60W 20/12* (2016.01); *B60W 10/06* (2013.01); *B60W 10/08* (2013.01); *B60W 10/11* (2013.01); *B60W 10/26* (2013.01); *B60W 20/50* (2013.01); *B60W 2540/10* (2013.01); *B60W 2540/12* (2013.01); *B60W 2540/18* (2013.01); *B60W 2540/20* (2013.01); *B60W 2550/10* (2013.01); *B60W 2550/30* (2013.01); *B60W 2550/408* (2013.01); *B60W 2710/0666* (2013.01); *B60W 2710/083* (2013.01); *B60W 2710/1005* (2013.01); *B60W 2710/242* (2013.01); *Y10S 903/915* (2013.01)

(58) Field of Classification Search
USPC .......................................................... 701/22
See application file for complete search history.

(56) References Cited

U.S. PATENT DOCUMENTS

| 8,452,473 B2 | 5/2013 | Ganley et al. |
| 2010/0138089 A1 | 6/2010 | James |

(Continued)

FOREIGN PATENT DOCUMENTS

EP   1065364 B1   1/2001

*Primary Examiner* — James M McPherson
(74) *Attorney, Agent, or Firm* — David B. Kelley; Brooks Kushman P.C.

(57) ABSTRACT

A hybrid electric vehicle having a powertrain including an engine and an electric machine, and controllers configured to derate powertrain output torque below a nominal maximum to a fault-torque limit, in response to a vehicle fault or issue. The vehicle and controllers are also configured to transiently increase powertrain torque output above the fault-torque limit in response to a torque demand that exceeds the limit, and which is needed to enable a predicted vehicle maneuver. The controller also establishes a predicted duration for the predicted interim vehicle maneuver and for override of the fault-torque limit and delivery of the additional torque from the torque-demand signal and other signals. The predicted duration includes a time span to maneuver through roadway obstacles and traffic, but does not exceed a limited operation time or a limited power output established by the controller from the vehicle issue or fault identified by the fault signal.

8 Claims, 4 Drawing Sheets

(56) References Cited

U.S. PATENT DOCUMENTS

| | | | | |
|---|---|---|---|---|
| 2010/0161154 A1* | 6/2010 | Moeckly | ............... | F01D 21/003 701/3 |
| 2010/0161196 A1* | 6/2010 | Goericke | ........... | G05B 23/0243 701/99 |
| 2010/0161197 A1* | 6/2010 | Moeckly | ............ | G05B 23/0254 701/99 |
| 2010/0161247 A1* | 6/2010 | Moeckly | ................... | F02C 7/00 702/41 |

* cited by examiner

FIG. 4
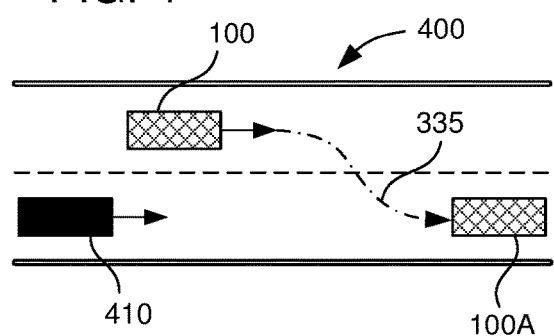
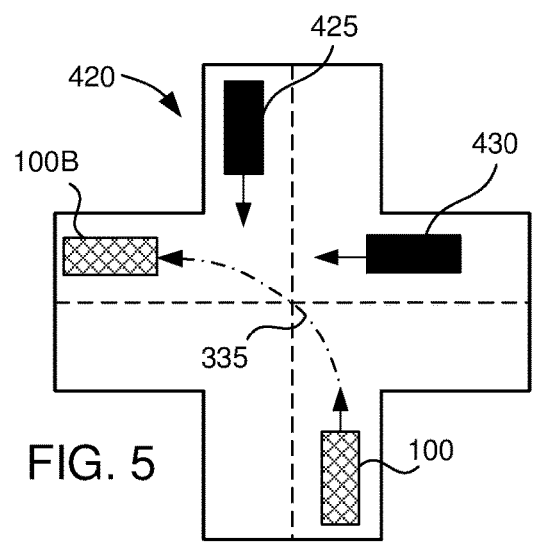
FIG. 5
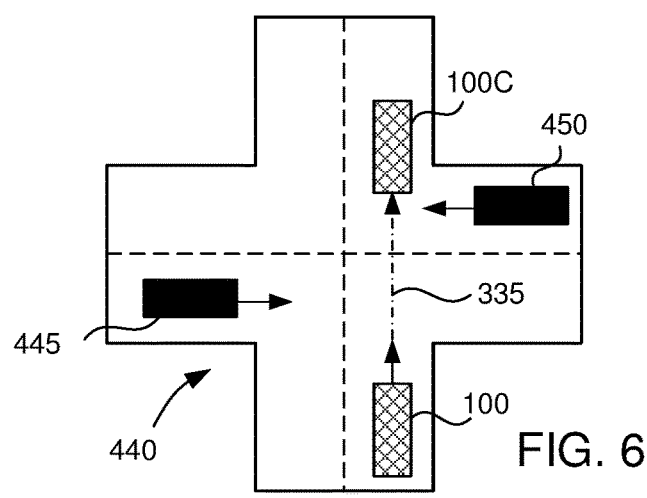
FIG. 6

VEHICLE POWERTRAIN CONTROLLER AND METHOD

TECHNICAL FIELD

The present disclosure relates generally to systems and methods for control of a powertrain of a vehicle.

BACKGROUND

Hybrid electric vehicles (HEVs) have a powertrain that includes an internal combustion engine (ICE) and an electric machine or electric motor generator (MG), which generate power and torque to propel the vehicle. Such HEVs may sometimes detect a fault or an anomaly during operation, which causes reconfiguration of the HEV to limit performance and prevent a further and/or continuing fault or anomaly, and until the detected fault or anomaly is resolved. During such reconfiguration and limited performance, certain HEV components may be configured to limit their operational capabilities. For example, powertrain anomalies may require performance to be derated, wherein one or both of the ICE and MG operate with reduced power or torque output, which in turn reduces available acceleration, speed, and performance of the HEV.

SUMMARY

A vehicle according to the present disclosure includes a driveline with a powertrain having an engine and an electric machine coupled with a clutch, and coupled to a battery or other power storage device. The powertrain powers the driveline, which also includes a transmission and torque convertor with a bypass or launch clutch, among other components. The vehicle further includes a controller configured to respond to a fault signal, and to derate powertrain torque below a nominal maximum to a fault-torque limit. The controller may further cause the engine and the electric machine to limit their individual or combined output torque to the fault-torque limit, while the powertrain torque is derated.

While performance is derated, an interim vehicle maneuver may be required, which is predicted and which generates a torque-demand signal requiring torque that may exceed the fault-torque limit. The interim vehicle maneuver may typically be a maneuver required to drive to vehicle to the side of a roadway or other convenient location to address the possible issue, anomaly, and/or fault. In response, the controller causes the powertrain torque output to transiently increase by an additional torque or a capacity to generate the additional torque above the fault-torque limit. The controller establishes the additional torque or capacity to generate it from the torque-demand signal to enable the predicted vehicle maneuver. The controller is also configured to enable the engine and/or the electric machine to output and/or to transiently increase its capacity to generate, alone or in combination, the additional torque during the interim vehicle maneuver.

The controller also predicts and/or establishes, from the torque-demand signal and other signals, a predicted duration for the interim vehicle maneuver and for override of the fault-torque limit and delivery of the additional torque. The controller may establish the predicted duration so that it does not exceed a limited operation time predicted or established by the controller from the fault signal. The torque-demand signal and other signals may further predict and/or establish a position, a position change, and a position change rate, of at least one of the engine and the electric machine, the vehicle, driver controls that may include one or more of an acceleration pedal, a brake pedal, a turn signal, a steering angle sensor, and other driver controls. The controller temporarily or transiently causes the increase in capacity to generate and causes the additional torque to be generated by the powertrain and either the engine or the electric machine, or both, during the interim vehicle maneuver.

Additionally, the torque-demand signal and the other signals predict and establish a position, a position change, and a position change rate, of the engine and the electric machine, the vehicle, and obstacles and/or other vehicles detected by any of a moving map sensor, an obstacle sensor, vehicle-to-vehicle signals, and/or infrastructure-to-vehicle signals. The controller also enables the engine or the electric motor or both increase generation capacities and to generate the additional torque during the interim vehicle maneuver around the obstacles and vehicles.

The transmission of the vehicle driveline and powertrain includes a number of gears. The controller is further configured to enable the transmission to operate with a limited number of gears when the fault signal is identified. Also, the controller may enable the transmission to operate with a capability to select a higher number or a full range of gears beyond the limited number while the powertrain torque output is increased by the additional torque during the predicted interim vehicle maneuver.

The present disclosure also includes the electric machine coupled to a battery, which is configured by the controller to limit power output to the electric machine while the powertrain torque is derated below the nominal maximum. The controller also responds to the torque-demand signal, and enables the battery to increase its capacity to transmit and to transmit increased power to the electric machine greater than the limited power output to generate the additional torque during the vehicle maneuver.

The present disclosure also describes a method for controlling a vehicle and a vehicle powertrain. The method includes the vehicle responding to an identified fault signal and commanding by a controller the powertrain to derate output torque below a nominal maximum to a fault-torque limit. The vehicle further commands by the controller, in response to a torque-demand signal that exceeds the fault-torque limit and which predicts or identifies an interim vehicle maneuver, the powertrain torque output capacity and actual torque output to increase by an additional torque predicted from the torque-demand signal and other signals to enable the predicted interim vehicle maneuver.

The powertrain is also commanded by the controller to increase its capacity to deliver and to deliver the additional torque for a predicted duration for the predicted interim vehicle maneuver. As before, the predicted duration is predicted and established by the controller from information embedded in, communicated with, and corresponding to at least one of the torque-demand signal and the other signals, and to not exceed a limited operation time defined by the controller from the fault identified by the fault signal.

This summary of the implementations and configurations of these vehicles introduces a selection of exemplary implementations, configurations, and arrangements, in a simplified and less technically detailed arrangement, and such are further described in more detail below in the detailed description in connection with the accompanying illustrations and drawings, and the claims that follow.

This summary is not intended to identify key features or essential features of the claimed technology, nor is it intended to be used as an aid in determining the scope of the claimed subject matter. The features, functions, capabilities, and advantages discussed here may be achieved independently in various example implementations or may be combined in yet other example implementations, as further described elsewhere herein, and which may also be understood by those skilled and knowledgeable in the relevant fields of technology, with reference to the following description and drawings.

BRIEF DESCRIPTION OF THE DRAWINGS

A more complete understanding of example implementations of the present disclosure may be derived by referring to the detailed description and claims when considered with the following figures, wherein like reference numbers refer to similar or identical elements throughout the figures. The figures and annotations thereon are provided to facilitate understanding of the disclosure without limiting the breadth, scope, scale, or applicability of the disclosure. The drawings are not necessarily made to scale.

FIG. 4 illustrates an exemplary schematic of a vehicle in operation according to the systems and methods of the earlier figures;

FIG. 5 depicts another example of a vehicle in operation with the methods and systems of the prior figures; and FIG. 6 shows an additional illustration of a vehicle in operation and employing the systems and processes of the preceding depictions.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art should understand, various features, components, and processes illustrated and described with reference to any one of the figures may be combined with features, components, and processes illustrated in one or more other figures to produce embodiments that should be apparent to those skilled in the art, but which may not be explicitly illustrated or described. The combinations of features illustrated are representative embodiments for typical applications. Various combinations and modifications of the features consistent with the teachings of this disclosure, however, could be desired for particular applications or implementations, and should be readily within the knowledge, skill, and ability of those working in the relevant fields of technology.

Figure 1:
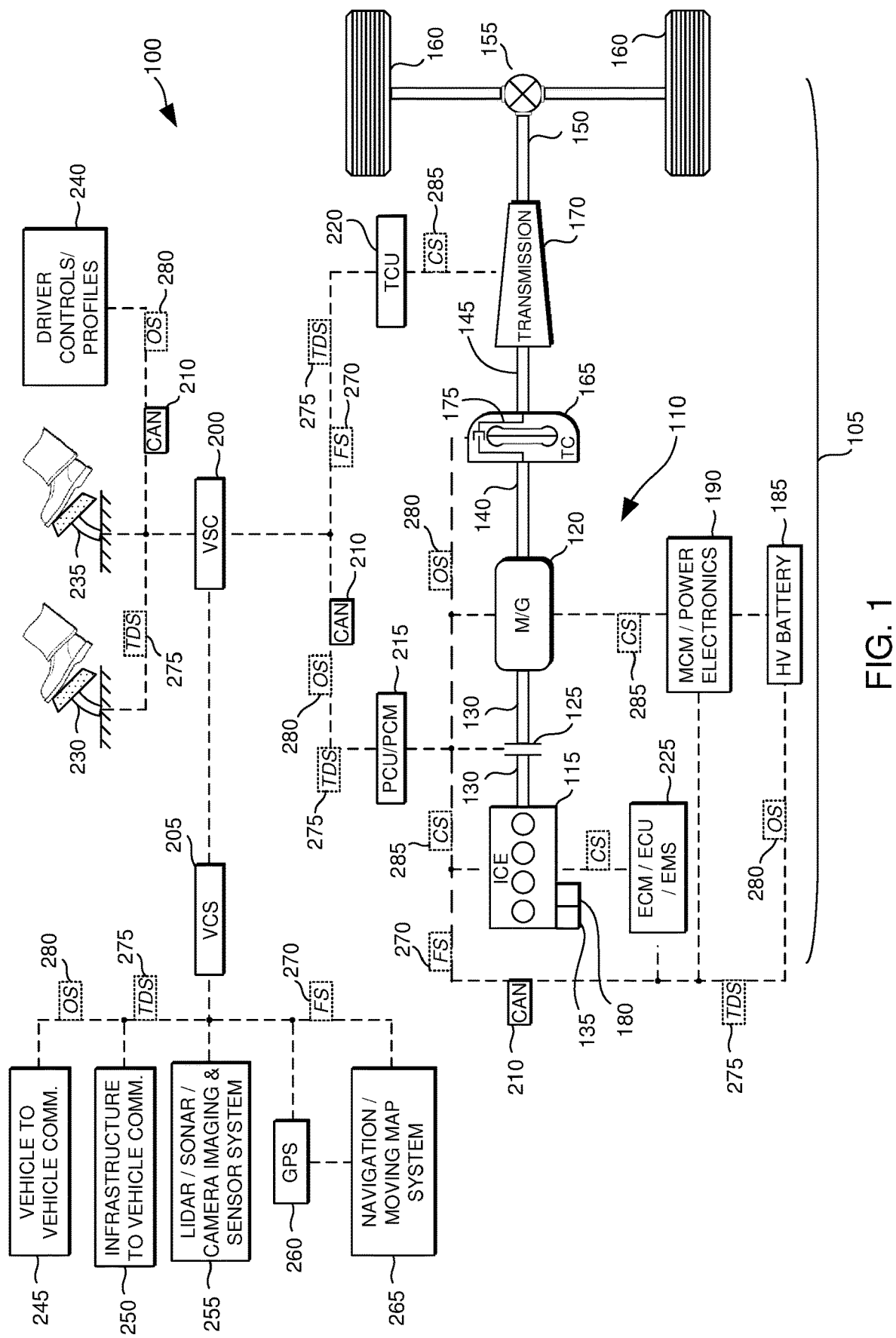
FIG. 1 is an illustration of a hybrid electric vehicle and its systems, components, sensors, actuators, and methods of operation.

With reference now to the various figures and illustrations and to FIGS. 1, 2, 3, 4, 5, and 6, and specifically now also to FIG. 1, a schematic diagram of a hybrid electric vehicle (HEV) 100 is shown and illustrates representative relationships among components of the HEV 100. Physical placement and orientation of the components within the vehicle 100 may vary. The vehicle 100 includes a driveline 105 that has a powertrain 110, which includes an internal combustion engine (ICE) 115 and an electric machine or electric motor/generator/starter (M/G) 120, which generate power and torque to propel the vehicle 100. The engine 115 is a gasoline, diesel, biofuel, natural gas, or alternative fuel powered engine, or a fuel cell. The engine 115 is coupled to the electric machine or M/G 120 with a disconnect clutch 125. The engine 115 generates an engine power and an associated engine torque that is transmitted to the M/G 120 when the disconnect clutch 125 is at least partially engaged.

The M/G 120 may be any one of a plurality of types of electric machines, and for example may be a permanent magnet synchronous motor 120. When the disconnect clutch 125 is at least partially engaged, power and torque may be transmitted from the engine 115 to the M/G 120 to enable operation as an electric generator, and to other components of the vehicle 100. Similarly, the M/G 120 may operate as an engine starter with the disconnect clutch 125 partially or fully engaged to transmit power and torque via disconnect clutch drive shafts 130 to the engine 115 to start the engine 115, in configurations that include or do not include an independent engine starter 135.

Further, the M/G 120 may assist the engine 115 a "hybrid electric mode" or an "electric assist mode" by transmitting additional power and torque to turn the drive shafts 130 and 140. Also, the M/G 120 may operate in an electric only mode wherein the engine 115 is decoupled by disconnect clutch 125 and shut down, enabling the M/G 120 to transmit positive or negative torque to the M/G drive shaft 140. When in generator mode, the M/G 120 may also be commanded to produce negative torque and to thereby generate electricity while the engine 115 is generating propulsion power for the vehicle 100. The M/G 120 also may enable regenerative braking by converting rotational energy transmitted through the driveline 105 from decelerating the wheels 160 into electrical energy for storage in one or more batteries 180, 185.

The disconnect clutch 125 may be disengaged to enable the engine 115 to stop or to run independently for powering engine accessories, while the M/G 120 generates drive power and torque to propel the vehicle 100 via M/G drive shaft 140, torque convertor drive shaft 145, and transmission drive shaft 150. In other arrangements, both the engine 115 and the M/G 120 may operate with the disconnect clutch 125 fully or partially engaged to propel the vehicle 100 through the drive shafts, differential 155 and wheels 160. The differential 155 transmits approximately equal torque to each wheel 160 and accommodates slight speed differences to enable the vehicle to turn and maneuver. Different types of differentials or similar devices may be used to distribute torque from the powertrain 110 to the wheels 160, for rear-dive, front-drive, and all-wheel drive vehicles. In some vehicles, differential torque distribution may be controlled and varied to enable desired operating modes or conditions.

The drive shaft 130 of the engine 115 and M/G 120 may be a continuous, single, through shaft that is part of and integral with M/G drive shaft 140, or may be a separate, independent drive shaft 130 that may be configured to turn independently of M/G drive shaft 140 for powertrains 110 that include multiple, inline, or otherwise coupled M/G 120 configurations. The schematic of FIG. 1 also contemplates alternative configurations where engine 115 and/or M/G 120 are offset from the drive shafts 130, 140, and where one or more of the engines 115 and M/Gs 120 are positioned elsewhere in the driveline, such as between a torque convertor and a transmission, or elsewhere. Still other arrangements are contemplated without deviating from the scope of the present disclosure.

The driveline 105 also includes a torque convertor (TC) 165 that couples the engine 115 and M/G 120 of the powertrain 110 to a transmission 170, which may be a multiple step-ratio automatic transmission or gearbox 170. Some skilled in the art may also understand that the torque convertor 165 is integrally formed as part of the transmission 170, and that the driveline includes only drive shafts, differentials, and wheel axles. However, for purposes of illustration, this disclosure includes all possible configurations of separate and integral-transmission torque converters, and drivelines that include all such possible subjective definitions. The torque convertor 165 may further incorporate a bypass clutch and clutch lock 175 which may also operate as a launch clutch, to enable further control and conditioning of the power and torque transmitted from the powertrain 110 to the other components of the vehicle 100.

The torque convertor 165 incorporates an impeller fixed to M/G drive shaft 140 and a turbine fixed to torque convertor drive shaft 145. The torque convertor 165 establishes a hydraulic or hydrodynamic coupling between drive shafts 140 and 145, which transmits power from the impeller to the turbine when the impeller rotates faster than the turbine. The magnitudes of the turbine and impeller torques depend upon the relative speeds and accelerations. When the ratio of impeller speed to turbine speed is sufficiently high, the torque convertor performs as a torque multiplier whereby turbine torque is a multiple of the impeller torque.

The torque convertor bypass clutch 175, which is also referred to as a torque convertor lock-up clutch, is typically configured to frictionally or mechanically couple the impeller and the turbine to rotate as an integral unit, which eliminates variable hydraulic slip energy loss and establishes more efficient power transfer across the torque convertor 165. The torque convertor bypass clutch 175 may also be engaged to operate as a launch clutch for smooth vehicle launch. Alternatively, or in combination, the torque convertor bypass clutch 175 may be configured as a launch clutch similar to disconnect clutch 125 and may be positioned between M/G 120 and transmission 170, for applications that do not include or require torque convertor 165 or bypass clutch 175. In some applications, disconnect clutch 125 is generally referred to as an upstream clutch and torque convertor bypass clutch 175 is generally referred to as a downstream clutch. The disconnect clutch 125 and the torque convertor bypass clutch 175 can be modulated over a range between the engaged and disengaged positions. For the torque convertor bypass clutch 175, this enables a variable mechanical slip in the torque convertor 165, in addition to the variable slip produced by the hydrodynamic coupling between the impeller and the turbine.

The multiple step-ratio automatic transmission or gearbox 170 may include gear sets (not shown) that are selectively placed in different gear ratios by hydraulic or electromechanical engagement of friction elements such as clutches and brakes to establish the desired multiple, discrete, or step drive ratios. The friction elements are controllable through a shift schedule implemented by one or more controllers that connects and disconnects certain elements of the gear sets to control the ratio between the output transmission drive shaft 150 and the input torque convertor drive shaft 145. The transmission 170 is automatically shifted from one ratio to another based on various vehicle operating conditions by the controllers, as described elsewhere herein. The transmission 170 then transmits powertrain output torque to output transmission shaft 150.

This transmission 170 is but one example of a transmission or gearbox arrangement, and any comparable multiple ratio transmission or gearbox that converts and transmits input torque(s) from engine 115 and M/G 120 to output drive shaft 150 at such different ratios, is contemplated for use with the embodiments described herein. For example, transmission 170 may be implemented by an automated mechanical (or manual) transmission that includes servo motors to translate and rotate shift forks along a shift rail to select a desired gear ratio, which can be configured for operation with a range of vehicle torque requirements.

Powertrain 110 and/or driveline 105 further include the one or more batteries 180, 185. One such battery can be a low voltage, direct current battery 180 operating in the range of between about 6 and 24 volts or more or less that is used to store and supply power for the starter 135 to start engine 115, and for other vehicle components and accessories. Another battery can be a higher voltage, direct current battery 185 operating in ranges between about 48 to 600 volts, and sometimes between about 140 and 300 volts or more or less, which is used to store and supply power for the M/G 120, and other vehicle components. The batteries 180, 185 are respectively coupled to the engine 115, the M/G 120, and the vehicle 100, as depicted in FIG. 1, through various mechanical and electrical interfaces and vehicle controllers as described elsewhere herein. The high voltage (HV) M/G battery 185 is also coupled to the M/G 120 by a motor control module (MCM) and/or power electronics 190, which are configured to condition direct current (DC) power provided by the HV battery 185 for the M/G 120, to condition, invert, and transform the DC battery power into three phase alternating current (AC) as is typically required to power the electric machine or M/G 120. The MCM/power electronics 190 are also configured to charge one or more batteries 180, 185 with energy generated by M/G 120 and/or electrical energy generating components.

With continued reference to FIG. 1, the vehicle 100 further includes one or more controllers and computing modules and systems that enable a variety of vehicle capabilities. For example, vehicle 100 may incorporate a vehicle system controller (VSC) 200 and a vehicle computing system (VCS) and controller 205, which are in communication with a network such as a controller area network (CAN) and interconnected groups of networks 210, and a larger vehicle control system and other vehicle networks that include other micro-processor-based controllers as described elsewhere herein. As depicted schematically in FIGS. 1, 2, and 3, CAN 210 may also include network controllers in addition to communications links between controllers, sensors, actuators, and vehicle systems and components.

While illustrated here for purposes of example, as discrete, individual controllers, the VSC 200 and VCS 205 may control, be controlled by, communicate signals to and from, and communicate with all other controllers, and other sensors, actuators, signals, and vehicle components that are part of the larger vehicle and control systems. The capabilities and configurations described in connection with any specific micro-processor-based controller as contemplated here may also be embodied in one or more other controllers and distributed across more than one controller such that multiple controllers can individually, collaboratively, in combination, and cooperatively enable any such capability and configuration. Accordingly, recitation of "a controller" or "the controller" is intended to refer to such controllers both in the singular and plural connotations, and individually, collectively, and in various suitable cooperative and distributed combinations of such controllers.

Further, the communications over the network and CAN 210 are intended to include responding to, sharing, transmitting, and receiving of commands, signals, data, control logic, and information between controllers, and sensors, actuators, controls, and vehicle systems and components. The controllers communicate with the vehicle networks and CAN 210 and the sensors, actuators, controls, systems, and components with one or more controller-based input/output (I/O) interfaces that may be implemented as single integrated interfaces enabling communication of raw data and signals, or signal conditioning, processing, and/or conversion, short-circuit protection, and similar capabilities. Alternatively, one or more dedicated hardware or firmware devices, controllers, and systems on a chip (SoCs) may be used to precondition and preprocess particular signals before such are communicated.

In further illustrations, the VSC 200, VCS 205, CAN 210, and other controllers, may include one or more microprocessors or central processing units (CPU) in communication with various types of computer readable storage devices or media. Computer readable storage devices or media may include volatile and nonvolatile storage in read-only memory (ROM), random-access memory (RAM), and non-volatile or keep-alive memory (NVRAM or KAM). NVRAM or KAM is a persistent or non-volatile memory that may be used to store various commands, executable control logic and instructions and code, data, constants, and variables needed for operating the vehicle and systems, while the vehicle and systems and the controllers and CPUs are unpowered or powered off. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data.

With attention invited again to FIG. 1, vehicle 100 also may include VCS 205 to be the SYNC onboard vehicle computing system manufactured by the Ford Motor Company (See, for example, U.S. Pat. No. 9,080,668). Vehicle 100 also may include a powertrain control unit/module (PCU/PCM) 215 coupled to VSC 200 or another controller, and coupled to CAN 210 and engine 115, M/G 120, and torque convertor 165 to control each powertrain component. A transmission control unit (TCU) 220 is also coupled to VSC 200 and other controllers via CAN 210, and is coupled to the transmission 170 and also optionally to torque convertor 165, to enable operational control. An engine control module (ECM) or unit (ECU) or energy management system (EMS) 225 may also be included to be in communication with the CAN 210, and is coupled to engine 115 and VSC 200 in cooperation with PCU 215 and TCU 220 and other controllers.

In this arrangement, VSC 200 and VCS 205 cooperatively and distributively manage and control the vehicle components and control and be controlled by other controllers, and may include duplicate and backup controllers that may operate in parallel to enable continuous real-time operation in the event any one or more controllers become inoperative or unreliable. For further example, the controllers may communicate control commands, logic, and instructions and code, data, information, and signals to and/or from engine 115, disconnect clutch 125, M/G 120, torque convertor 165, transmission 170, batteries 180, 185, and MCM 190, and other components and systems. The controllers also may control and communicate with other vehicle components known to those skilled in the art, even though not shown in the figures. The embodiments of vehicle 100 in FIG. 1 also depict exemplary sensors and actuators in communication with the vehicle network and CAN 210 that can transmit and receive signals to and from the VSC 200, VCS 205, and other controllers.

For example, vehicle 100 may include an accelerator position and motion sensor (APP) 230, a brake pedal position and motion sensor (BPP) 235, and other driver controls 240 that may include steering wheel position and motion sensors, driver turn signal position sensors, driver selectable vehicle performance preference profiles and parameters, and driver selectable vehicle operational mode sensors and profile parameters and settings. Further, vehicle 100 may have VCS 205 configured with one or more communications, navigation, and other sensors, such as a vehicle to vehicle communications system (V2V) 245, and roadway infrastructure to vehicle communication system (I2V) 250, a LIDAR/SONAR (light and/or sound detection and ranging) and/or video camera roadway proximity imaging and obstacle sensor system 255, a GPS or global positioning system 260, and a navigation and moving map display and sensor system 265. The VCS 205 can cooperate in parallel, in series, and distributively with VSC 200 and other controllers to manage and control the vehicle 100 in response to sensor and communication signals identified, established by, communicated to, and received from these vehicle systems and components.

For further example, various other vehicle functions, actuators, and components may be controlled by the controllers within the vehicle systems and components, and may receive signals from other controllers, sensors, and actuators, which may include, for purposes of illustration but not limitation, fuel injection timing and rate and duration, throttle valve position, spark plug ignition timing (for spark-ignition engines), intake/exhaust valve timing and duration, front-end accessory drive (FEAD) components such as an air conditioning compressor, an alternator or generator, and M/G 120 and coupled HV and low voltage battery 180, 185 sensors for regenerative braking, battery charging or discharging (including sensors for determining the maximum charge, state of charge, and discharge power limits), temperature, voltage, current, state of charge (SOC), maximum charge, and discharge power limits, clutch pressures for disconnect clutch 125, bypass/launch clutch 175, torque convertor 165, transmission 170, and other components. Sensors communicating with the controllers and CAN 210 may, for further example, establish or indicate turbocharger boost pressure, crankshaft position or profile ignition pickup (PIP) signal, engine rotational speed or revolutions per minute (RPM), wheel speeds (WS1, WS2, etc.), vehicle speed sensing (VSS), engine coolant temperature (ECT), intake manifold air pressure (MAP), accelerator pedal position sensing (PPS) or APP 230, brake pedal position sensing (BPS) or BPP 235, ignition switch position (IGN), throttle valve position (TP), air temperature (TMP), exhaust gas oxygen (EGO) or other exhaust gas component concentration or presence, intake mass air flow (MAF), transmission gear, ratio, or mode, transmission oil temperature (TOT), transmission turbine speed (TS), torque convertor bypass clutch 175 status (TCC), and deceleration or shift mode (MDE), among others.

Figure 2:
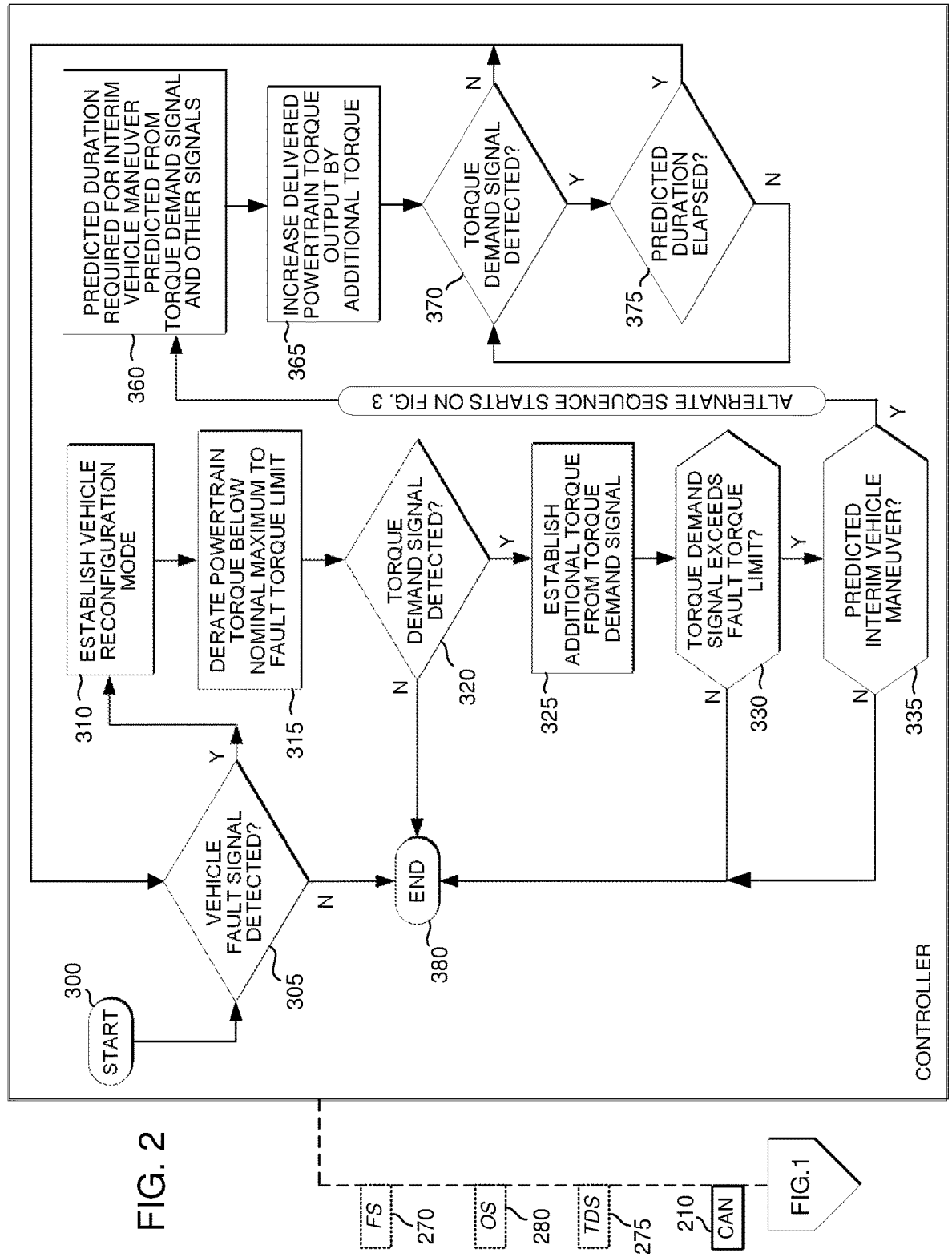
FIG. 2 illustrates additional aspects and capabilities of the vehicle and systems and methods of FIG. 1 with certain components removed and rearranged.
Figure 3:
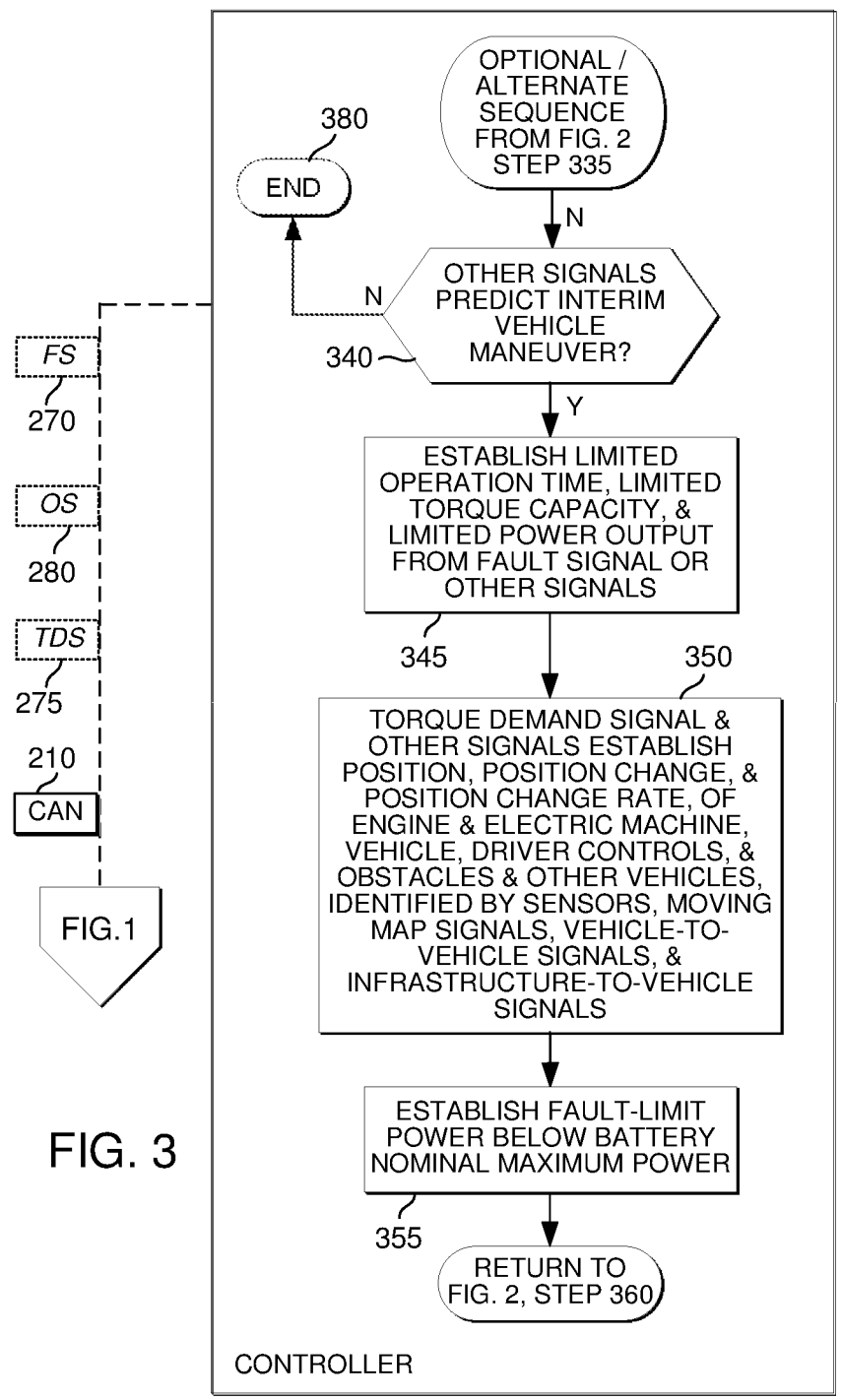
FIG. 3 depicts other aspects of the vehicle systems and methods of FIGS. 1 and 2 with various components and method steps rearranged and or removed for illustration purposes.

As depicted in the various figures, including FIGS. 1, 2, and 3, such control logic and executable instructions and signals, and data can also include vehicle fault signals (FS) 270, torque-demand signals (TDS) 275, other signals (OS) 280, and control or command signals (CS) 285 sent to vehicle components and systems. The FS 270, TDS 275, and OS 280 may be from any of the vehicle controllers, sensors, actuators, components, and systems signals. Any or all of these signals can be raw analog or digital signals or preconditioned, preprocessed, combination, and/or derivative signals generated in response to other signals, and may represent voltages, currents, capacitances, inductances, impedances, and digital representations thereof, as well as digital information that embeds such signals, data, and analog, digital, and multimedia information.

The communication and operation of the described signals, commands, control instructions and logic, and data and information by the various contemplated controllers, sensors, actuators, and other vehicle components, may be represented schematically as shown in FIG. 1, and by flow charts or similar diagrams as exemplified in FIGS. 2, and 3. Such flow charts and diagrams illustrate exemplary commands and control processes, control logic and instructions, and operation strategies, which may be implemented using one or more computing, communication, and processing techniques that can include real-time, event-driven, interrupt-driven, multi-tasking, multi-threading, and combinations thereof. The steps and functions shown may be executed, communicated, and performed in the sequence depicted, and in parallel, in repetition, in modified sequences, and in some cases may be combined with other processes and omitted. The commands, control logic, and instructions may be executed in one or more of the described microprocessor-based controllers and may be embodied as primarily hardware, software, virtualized hardware, firmware, virtualized firmware, and combinations thereof.

During operation of vehicle 100, and with continued reference to FIG. 1 and now also to FIG. 2, vehicle 100 incorporates a controller, such as one or more of VSC 200, VCS 205, PCU 215, and others, which controller is configured to initiate control logic, command signals (CS), and instructions 300 (FIG. 2) to detect at step 305, FS 270 or OS 280 and to respond to one or more of the signals, including fault signal (FS) 270 and other signals (OS) 280. Next, if FS 270 or OS 280 are detected and establish or predict or identify an issue or anomaly or fault in a sensor, actuator, system, or component of vehicle 100, the controller can initiate a mode of operation 310 that is referred to as a limited operation strategy (LOS) mode or a reconfiguration mode (RM). This LOS/RM mode 310 and other modes may limit functions and operational performance capacity of various components in response to fault signal 270 and OS 280, until the anomaly or fault or issue is corrected, addressed, or otherwise dispositioned.

For purposes of illustration, if FS 270 identifies, predicts, and/or establishes an issue or anomaly or fault with engine 115, then VSC 200 or PCU 215 or another controller may limit operation of powertrain 110 and derate output torque below a nominal maximum torque output of engine 115 and/or powertrain 110, and to a fault-torque limit 315, which limits acceleration, speed, and performance of the vehicle 100. To accomplish the derating, the controller may further limit the operation of engine 115 and enable transient increased power output of M/G 120, while limiting the combined output torque of engine 115 and M/G 120 to fault-torque limit 315, which enables vehicle operation in LOS/RM mode 310 until the issue or anomaly with engine 115 is abated. In another circumstance, if FS 270 identifies or predicts an issue or anomaly with any other vehicle component, sensor, or system, such as, for example without limitation, M/G 120, high-voltage battery 185, or power electronics 190, then VSC 200 or MCM 190 or another controller may limit operation of the anomalous component and M/G 120, and may enable transient increased output of the engine 115, while limiting the combined or individual power to the fault-torque limit 315, until the anomaly is resolved. In either situation when the vehicle 100 is operating in LOS/RM 310, the output torque of a single component or a combination of components may be performance limited below respective nominal maximums and, for example, to fault-torque limit 315.

In further examples, if one or more of M/G 120, HV battery 185, or power electronics 190 may experience an issue or anomaly that requires LOS/RM 310 and derated power and torque operation to be limited to fault-torque limit 315. The controllers determine from fault signal 270 that a nominal maximum of 300 newton-meters (Nm) of torque output is available from M/G 120 for 10 minutes. The controllers then may establish fault-torque limit 315 to be a fraction of the nominal maximum, for example, 200 Nm or another value in view of performance considerations and capabilities of M/G 120 during the conditions causing the persisting fault signal 270. Despite the detected anomaly and derated performance, the HEV 100 may need to temporarily generate additional and/or full or higher power and torque output, when interim driving maneuvers are required to accelerate the HEV or vehicle 100 during operations on roadways and when navigating in an and obstacles, intersections, traffic, and during other circumstances.

Such an interim driving maneuver may be different from nominal driving conditions and requirements due to the LOS/RM condition. An interim driving maneuver may include, for purposes of illustration but not limitation, circumstances where the vehicle must be driven through traffic and roadway congestion, around roadway obstacles, and under various roadway conditions to a preferred or convenient location where the possible fault, issue, or anomaly can be resolved, abated, and/or otherwise investigated and addressed.

When the vehicle 100 is operated in LOS/RM modes 310 with the powertrain 110 derated by the fault-torque limit 315, the controllers may be further configured to monitor for and detect and predict a torque-demand signal (TDS) 275, which may arise from any of the vehicle sensors, actuators, components, and systems (see, e.g., FIG. 1 and FIG. 2, step 320). For example, TDS 275 may arise and be predicted from a driver actuation of APP 230, BPP 235, other driver controls 240 such as a steering wheel actuation or a turn signal actuation, or from transmission 170 and TCU 220 in response to road conditions such as a roadway incline. TDS 275 may also be initiated and predicted from any of the controllers such as VSC 200 and VCS 205 and related subsystems in response to other internal or external vehicle conditions, which may operate alone or in concert to predict prospective vehicle maneuvers and prospective interactions between the vehicle 100 and other obstacles, vehicles, and roadway conditions.

VSC 200, TCU 220, transmission 170, or TC 165 may generate and/or predict TDS 275 and include or embed in the signal, information from other controllers, sensors, components, an systems that include, predict, communicate, and/or that establish an amount of increased torque 325 demanded and/or to be likely be demanded from powertrain 110, among other embedded information. Alternatively, VSC 200 or other controllers may predict or determine the torque demanded with other information embedded in TDS 275 and OS 280, as well as in some circumstances FS 270. If TDS 275 includes information that predicts a required vehicle acceleration and predicts a required increase in or additional torque 325 that does not exceed (step 330) the fault-torque limit 315 that is imposed during derated LOS/RM 310, then the controllers do not change or increase the capacity to deliver and/or the torque delivered by powertrain 110.

The TDS 275 or OS 280 may include information that predicts a vehicle maneuver or a predicted vehicle acceleration that requires or demands or predicts an additional or increased torque 325, during derated LOS/RM operation. Such a predicted interim vehicle maneuver 335, 340 may be established and/or predicted to require torque to accelerate the HEV or vehicle 100 that exceeds (step 330) fault-torque limit 315. If so, then the controllers next further predict from TDS 275 or OS 280 how much additional torque 325 is required by the predicted interim vehicle maneuver 335, 340, and further predict a duration 365 that specifies how long such predicted additional torque 325 may be needed to complete the predicted maneuver 335. (See, for example, FIG. 2, and optional alternate sequence of FIG. 3).

During LOS/RM 310 operations when powertrain output torque is derated, a pending vehicle maneuver may require full power or torque output, or increased torque output exceeding the fault-torque limit 315. The full or increased power from the powertrain may be needed to maneuver the vehicle 100 through traffic congestion or about roadway obstacles to exit a roadway, despite the previously detected vehicle issue or anomaly. Full speed, acceleration, and power may be predicted and required of vehicle 100 to enable the pending, predicted vehicle maneuver, so the vehicle may exit a roadway to address the issue or fault. However, TDS 275 may be generated by TCU 220 and VSC 200 or other controllers when a vehicle deceleration is detected, which requires torque output that exceeds (step 330) fault-torque limit 315, such as when vehicle 100 ascends a roadway incline. But during such an incline induced deceleration and TDS 275, the controllers may not also identify or predict interim vehicle maneuver 335, 340. Consequently, an override of the fault-torque limit 315 and the LOS/RM mode 310 may be unwarranted or inappropriate in view of the persisting FS 270 and an identified vehicle issue or anomaly or fault.

The controllers may embed in TDS 275 or OS 280 added information that enables evaluation and prediction, as noted elsewhere herein, of whether the interim vehicle maneuver 335, 340 is pending. This added information may be derived from TDS 275 and/or OS 280, and also may be communicated directly from vehicle controllers, sensors, actuators, systems, and components, to determine whether to override FS 270 and fault-torque limit 315 of LOS/RM 310. Such added information may be derived, for example, from sensors and components including APP 230, BPP 235, driver controls 240 (turn signals, steering position and motion, etc.), V2V 245, I2V 250, roadway imaging and obstacle sensors 255, moving map system 265 and other sensors. With such further information, VCS 205 and other controllers may establish that predicted interim vehicle maneuver 335, 340 is pending, which in addition to the TDS 275, requires override of the fault-torque limit 315. The controller (s), such as VSC 200, PCU 215, or other controllers may then generate CS 285 to enable powertrain 110 to deliver additional, increased, or full torque output capability 325 of the powertrain 110 to vehicle 100 and thereby enable the predicted interim vehicle maneuver 335, 340.

VSC 200, VCS 205, and other controllers may be further configured to also establish or predict from FS 270 and OS 280 one or both of a limited operation time 345 (FIG. 3) for a limited operation time, a limited torque capacity, and a limited power output 345, which alone or together limit how long and how much added torque may be applied. These limits are predicted or established in consideration of an identified vehicle fault that may prevent full power operation or operation beyond some brief period of time, while the FS 270 and LOS/RM 310 persist. The identified vehicle fault may enable increased power and torque output for a period of time despite the fault or anomaly, but may unfavorably lose operational capability if operated above the fault-torque limit for too long a time beyond the predicted or established limited operation time 345, limited torque capacity, and limited power output 345.

Using the example described elsewhere herein, of the controllers determining that M/G 120 has 10 minutes of 300 Nm torque output capacity remaining (nominal maximum), the controllers may establish the limited operation time 345 to be less than 10 minutes, to ensure the vehicle operation reverts to LOS/RM 310 in view of any operation constraints arising from FS 270, and which also may maintain a reserve of power to enable a slow speed, or crawl or creep along mode for a short time before available power is exhausted. The controllers may further establish the predicted duration 365 to not exceed this limited operation time 345 for limited operation, and may communicate alerts and a countdown to the vehicle 100 and a driver to improve a likelihood of completion of the interim vehicle maneuver(s) 335, 340. The controllers may also implement the additional or increased torque above the fault-torque limit to not exceed the limited torque capacity and limited power output 345 as may be required by the vehicle fault condition.

In addition, the VSC 200, VCS 205, and other controllers may further establish a predicted duration 365 during which the fault-torque limit 315 should be overridden and CS 285 be generated and communicated to enable powertrain 110 to deliver at step 365 the full or increased, additional torque 325 to vehicle 100, despite the persisting fault signal 270 and LOS/RM 310. The predicted duration 360 is established to enable completion of the interim vehicle maneuver 335, 340 after which the powertrain 110 will once again be derated by the vehicle protective LOS/RM 310. The predicted duration 360 is also established to include enough time to enable vehicle 100 to complete the interim vehicle maneuver 335, 340 through and around traffic and nearby vehicles) or roadway obstacles or construction identified by the vehicle sensors and systems (for example, V2V 245, I2V 250, imagers and sensors 255, navigation map systems 265).

During the predicted duration 360 of the interim vehicle maneuver 335, 340 when powertrain 110 torque output is increased and the fault-torque limit 315 is overridden, the control logic and instructions 300 continue to detect whether TDS 275 persists (step 370) and whether predicted duration 360 has elapsed (step 375), and may discontinue the override in either instance at final step 380. In instances where the predicted duration 360 has elapsed, but the TDS 275 persists and the vehicle maneuver is not yet complete, the cycle may be repeated as often as needed, and a new additional torque 325, 365 is determined, another predicted duration 360 may be established, and the other steps may also be repeated to enable completion of the initial and possible subsequent predicted interim vehicle maneuvers 335, 340.

In further examples of vehicle 100 and its operation, the TDS 275 and OS 280 establish at step 350, a position, a position change, and a position change rate, of various sensors, actuators, components, and systems of vehicle 100, which may include engine 115, electric machine or M/G 120, the vehicle 100, driver controls 240 (that may include one or more of APP 230, BPP 235, turn signals, steering angle and motion sensors, and other driver controls), as well as items external to vehicle 100. Such external items may include, for example, obstacles detected by one or more of navigation and moving map sensor and system 265 and obstacle sensor 255, and other vehicles, identified by one or more signals from navigation and moving map system 265, V2V 245, and I2V 250.

In another arrangement, transmission 170 may be configured by TCU 220 or another controller to operate with a limited number of gears when FS 270 is detected or identified. Additionally, TCU 220 or another controller may enable transmission 170 to operate with a capability to select a higher number of gears than the limited number while the powertrain 110 torque output is increased by the additional torque 325 for the predicted duration 360 and during the predicted interim vehicle maneuver 335, 340. For further illustration, MCM 190, VSC 200, and other controllers may limit power output from high-voltage battery 185 to M/G or electric machine 120, while powertrain torque is derated below the nominal maximum during LOS/RM 310. The high-voltage battery 185 may be limited to supply power below a nominal maximum power 355 to a fault-limit power 355. In response to TDS 275, any of MCM 190, VSC 200, and/or other controllers may also enable or cause high-voltage battery 185 to transmit full, additional, or increased power to M/G 120 that is greater than the limited power output 345 or fault-limit power 355, to generate the additional or increased torque 325 during the predicted vehicle maneuver 335, 340 and during override of the fault-torque limit 315.

With continued reference to FIGS. 1, 2, and 3, attention is now also directed to FIGS. 4, 5, and 6, which depict vehicle 100 in various roadway circumstances during operation. For further purposes of illustration but not limitation, in FIG. 4, vehicle 100 may be proceeding along a roadway 400 and experience a vehicle anomaly, which causes VSC 200 or another controller to generate FS 270, which is communicated via CAN 210, and which may generate an alert to a driver. In response to FS 270, the controllers establish LOS/RM 310 and derate the output torque of powertrain 110 to fault-torque limit 315.

Controller VCS 205, such as the Ford Motor Company SYNC system, or other controllers, may also detect a nearby vehicle 410 and its speed and direction, from OS 280 received from onboard systems such as V2V 245, I2V 250, or imaging and obstacles sensors 255. The controllers may also detect the position and speed of the vehicle 100 from OS 280 received from GPS 260 and moving map system 265, and other sensors. Further, the controllers may detect and predict prospective positions of other vehicles, roadway obstacles and conditions, and a driver initiated TDS 275 by way of APP 230, driver controls 240 (turn signal, steering wheel motion), or other controllers, sensors, and actuators, which alone or in combination establish predicted interim vehicle maneuver 335, 340. Consequently, the driver may be predicted to accelerate past the nearby vehicle 410, to maneuver vehicle 100 to the predicted position of vehicle 100A in FIG. 4 in front of the other nearby vehicle 410 in future position that is also predicted by the controllers.

With the TDS 275 and OS 280 that embed or describe the above-noted information, the controllers then establish how much additional torque 325 is needed to enable the predicted interim vehicle maneuver 335, 340, whether the additional torque 325 exceeds the fault-torque limit 315, and a predicted duration 360 of time needed to complete the predicted maneuver 335, 340. If required or appropriate, one or more of the controllers also establish and/or predict in view of the FS 270 and the identified vehicle fault whether a limited operation time 345 and limited torque capacity 345 is appropriate to limit the delivery of additional torque 325. Also, the controllers command the powertrain 110 to override the fault-torque limit 315 for the predicted duration 360 to enable the vehicle 100 to proceed with the predicted maneuver 335, 340, and thereby enable the driver to move ahead of the adjacent or nearby vehicle 410 to predicted position 100A, and then exit the roadway if appropriate.

With continued reference to the preceding figures, and now also to FIGS. 5 and 6, different roadways 420 and 440 are illustrated that show the vehicle 100 entering 4-way intersections that are congested with other vehicles 425, 430, 445, and 450. As before, vehicle 100 hypothetically experiences an issue that causes FS 270 and LOS/RM 310, during which the driver intends to and is predicted by the controllers to proceed despite the anomaly and to initiate the respective, predicted interim vehicle maneuvers 335, 340, and to proceed across each intersection respectively to predicted vehicle positions 100B, 100C.

Similar to the preceding example of FIG. 4, TDS 275 is generated and OS 280 are received identifying the other vehicles 425, 430, 445, 450 nearby and having speeds and directions, from which such information future positions may be predicted. In response to the oncoming traffic in these hypothetical congested-intersections, the driver may respond with a full tip-in or rapid, maximum APP 230 deflection, and/or a turn signal 240, and a rotation of the steering column 240. The information representing these driver actions may be embedded in TDS 275 or OS 280 to indicate an enable the predicted interim vehicle maneuver 335, 340 and that full power or torque higher than the fault-torque limit 315 is further predicted to be required. In response, the controllers will again predict and determine the needed additional torque above fault-torque limit 315 and the predicted duration 360, and cause or command the powertrain 110 to override limit 315 and enable capacity to deliver up to full power at the nominal maximum for the predicted maneuver 335, 340 (or as much capacity and/or additional torque 325 as may be available in view of vehicle-fault-limited operation time 345, limited torque capacity 345, or limited power output 345), and until the predicted maneuver 335, 340 is completed, and/or FS 270 and LOS/RM 310 are abated or resolved.

The descriptions herein refer to systems, methods, components, elements, nodes, or features being in "communication" and or "coupled" together. As used herein, unless expressly stated otherwise, use of these terms and words are intended and must be understood to mean that one system/method/sensor/actuator/component/element/module/feature is directly or indirectly coupled, joined to, and/or communicates with another, either electronically, mechanically, or both and in some similar way that enables cooperative operation and exchange and interchange of data and information.

Further, even though the various described implementations, figures, illustrations, and drawings depict representative examples and arrangements of components, elements, devices, and features, many different additional variations, arrangements, modifications, and intervening components, elements, devices, and features, may also be present in further exemplary implementations that are contemplated by the present disclosure.

Terms, words, and phrases used in this document, and variations thereof, unless otherwise expressly stated, must be construed as open ended as opposed to limiting. For example, the term "including" should be understood to mean "including, without limitation" or similar meanings; the term "example" is used to loosely describe illustrative instances of the item being described, but is not an exhaustive, exclusive, or limiting list; and adjectives such as "conventional," "traditional," "normal," "standard," "known", and terms with similar meanings must not be construed to limit the description to a given example, or to an exemplary item commercially available in the market as of a specific date and time period.

Instead, these descriptions are intended to be understood to include conventional, traditional, normal, or standard technologies that may be available now and at any time in the future in some improved and modified form according to the innovations described in this disclosure. Similarly, a group of words described and joined with the conjunction "and" or the disjunctive "or" must be understood only as exemplary and representative but not exclusive groups, and not as requiring that only or each and every one of those described items must be or must not be present in the contemplated group. Rather, use of such conjunctives and disjunctives must be understood to mean "and/or" unless expressly stated otherwise.

Similarly, a group of words linked with the conjunction "or" must not be understood as requiring mutual exclusivity among that group, but rather must also be understood as meaning "and or" unless expressly stated otherwise. Also, although words, items, elements, or components of this disclosure are described or claimed in the singular, the plural is also intended and contemplated to be within the scope of such a description unless limitation to the singular is explicitly stated as a requirement. The presence or absence of broadening words and phrases such as "one or more," "at least," "but not limited to" or other like phrases in some instances are intended to be interpreted to contemplate broader meanings, but must not be understood to mean that narrower meanings are implied, intended, or required.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
   a powertrain coupled to a controller configured to,
   responsive to identifying a fault signal indicative of a fault with an engine of the powertrain, derate powertrain torque below a nominal maximum to a fault-torque limit; and
   responsive to a torque-demand signal for a predicted interim vehicle maneuver requiring a predicted vehicle acceleration exceeding the fault-torque limit, cause the powertrain to override the fault-torque limit for a predicted duration corresponding to the predicted vehicle acceleration.

2. The vehicle accord ng to claim 1, further comprising:
   the controller further configured to predict the predicted duration and an additional torque both for the predicted interim vehicle maneuver, from at least one of the torque-demand signal and other signals, which predicted duration including a time span and the additional torque correspond to the predicted interim vehicle maneuver, but respectively do not exceed a limited operation time and limited torque capacity for a vehicle fault corresponding to the fault signal.

3. The vehicle according to claim 2, further comprising:
   the powertrain including an electric machine; and
   the controller causes one or more of the engine and the electric machine to override the fault-torque limit for the predicted duration, and to increase capacity to generate the additional torque during the predicted interim vehicle maneuver.

4. The vehicle according to claim 1, further comprising:
   the powertrain including an electric machine; and
   the predicted duration includes a time span corresponding to the predicted interim vehicle maneuver, but does not exceed a limited operation time for a vehicle fault corresponding to the fault signal.

5. The vehicle according to claim 4, further comprising:
   the controller predicts the predicted vehicle acceleration from at least one of the torque-demand signal and other signals that communicate one or more of a position, a position change, and a position change rate of the vehicle and one or more (a) obstacles and (b) other vehicles, identified by one or more of moving map signals, vehicle-to-vehicle signals, and infrastructure-to-vehicle signals, and
   the predicted duration includes a time span corresponding to the predicted interim vehicle maneuver for maneuvering around the one or more obstacles and other vehicles, but does not exceed a limited operation time for a vehicle fault corresponding to the fault signal.

6. The vehicle according to claim 1, further comprising:
   the powertrain including a transmission configured by the controller to operate with a limited number of gears responsive to the fault signal; and
   the controller causes the transmission to operate with a capability to select a higher number of gears than the limited number while the fault-torque limit is overridden and during the predicted interim vehicle maneuver.

7. The vehicle according to claim 1, further comprising:
   the powertrain including an electric machine;
   at least one of the engine and the electric machine each configured by the controller to limit their combined output torque to the fault-torque limit, while the powertrain torque is derated; and
   the controller causes one or more of the engine and the electric machine to increase capacity to output more than the fault-torque limit for the predicted duration and during the predicted interim vehicle maneuver.

8. The vehicle according to claim 1, further comprising:
   the powertrain including an electric machine;
   the electric machine coupled to a battery that is configured by the controller to limit power output to the electric machine while the powertrain torque is derated; and
   the controller, responsive to the torque-demand signal, causes the battery to increase capacity to transmit increased power to the electric machine greater than the limited power output for the predicted duration and during the predicted interim vehicle maneuver.

* * * * *